United States Patent [19]
Nash

[11] Patent Number: 5,136,840
[45] Date of Patent: Aug. 11, 1992

[54] GAS TURBINE ENGINE ACTUATION SYSTEM

[75] Inventor: Dudley O. Nash, Cincinnati, Ohio

[73] Assignee: General Electric Company, Cincinnati, Ohio

[21] Appl. No.: 429,734

[22] Filed: Sep. 30, 1982

[51] Int. Cl.$^5$ .............................. F02K 3/02
[52] U.S. Cl. ........................ 60/226.3; 60/262
[58] Field of Search .......... 60/39.14, 39.66, 204, 60/225, 226.03, 224, 229, 230, 232, 261, 262, 263, 226.1, 248, 264; 415/160, 162, 157; 24/99 R, 110

[56] References Cited

U.S. PATENT DOCUMENTS

| | | | |
|---|---|---|---|
| 3,057,541 | 10/1962 | Hasbrouck et al. | 230/114 |
| 3,898,799 | 8/1975 | Pollert et al. | 60/39.07 |
| 4,072,008 | 2/1978 | Kenworthy et al. | 60/261 |
| 4,175,384 | 11/1979 | Wagenknecht et al. | 60/226 B |

Primary Examiner—Michael J. Carone
Attorney, Agent, or Firm—Jerome C. Squillaro; David L. Narciso

[57] ABSTRACT

An actuation system for a gas turbine engine is provided for axially translating an annular member such as a cylindrical sleeve valve of a variable area bypass injector (VABI). In one embodiment, the actuation system comprises a crankshaft rotatably attached at an outer casing of the engine for transmitting rotational movement. A crankarm is pivotally connected between the annular member and the crankshaft for transmitting rotation of the crankshaft to helical motion of the annular member. Two linkarms are circumferentially spaced from the crankarm, and are pivotally connected between the annular member and the outer casing. The linkarms are effective for synchronizing the motion of the annular member when the crankshaft is rotated.

12 Claims, 2 Drawing Sheets

GAS TURBINE ENGINE ACTUATION SYSTEM

FIELD OF THE INVENTION

This invention relates to actuation systems for use in gas turbine engines and, more particularly, an actuation system for translating an annular member thereof.

BACKGROUND OF THE INVENTION

In variable cycle gas turbine engines, the amount of air flowing through bypass ducts is varied under different operating conditions to improve engine performance. In one embodiment of such engines, airflow is controlled by an annular sliding valve system, sometimes referred to as a variable area bypass injector (VABI), that is effective for controlling the amount of airflow in inner and outer annular bypass ducts.

The VABI system typically includes an axially translatable annular member. This member comprises either a cylindrical sleeve valve, or a synchronizing ring that uniformly positions a plurality of circumferentially disposed drop chute valve members for controlling the amount of flow through the ducts.

For example, a forward VABI comprising a cylindrical sleeve valve can be used for controlling the amount of airflow in the outer bypass duct that bypasses a combustor of the engine. A rear VABI comprising a cylindrical sleeve valve or drop chutes can be provided for injecting airflow from the outer bypass duct into a discharge flow from a core engine of the gas turbine engine.

Variable cycle engines including VABIs are disclosed in "Individual Bypass Injector Valves for a Double Bypass Variable Cycle Turbofan Engine", U.S. Pat. No. 4,175,384-Wagenknecht et al, "Variable Area Bypass Injector System", U.S. Pat. No. 4,072,008-Kenworthy et al, and "Actuation System For Use on a Gas Turbine Engine", U.S. Ser. No. 252,687-Nash et al, now U.S. Pat. No. 4,409,788 all incorporated herein by reference.

A VABI can also be used to vary the amount of bypass airflow injected into an afterburning section of a gas turbine engine. Such a VABI system is disclosed in "Variable Slot Bypass Injector System", U.S. Ser. No. 317,356, Vdoviak et al, incorporated herein by reference.

A variable cycle engine useful as an aircraft engine requires a relatively simple and lightweight actuation system for positioning of the vABI system. In this regard, a minimum number of actuators and linkages associated with the actuation system is preferred. However, the actuation system must be capable of transmitting sufficiently large force to the translating annular member for translating the member without allowing the member to tilt, and thus bind.

Prior art actuation systems typically include multiple radial shafts extending through an engine casing. These shafts can be driven by a plurality of actuators or, in the case where fewer actuators are used, synchronizing rings are used for uniformly transmitting the force from the actuators to all the radial shafts for translating the annular member thereof without binding. However, typical prior art actuation systems have substantial complexity and weight and therefore are undesirable.

Accordingly, it is an object of the present invention to provide a new and improved actuation system for a gas turbine engine.

Another object of the present invention is to provide an actuation system for translating an annular member in the gas turbine engine.

Another object of the present invention is to provide an actuation system having one actuator and a reduced number of members and linkages for translating the annular member.

Another object of the present invention is to provide a relatively simple and lightweight actuation system for axially translating an annular valve member of a variable area bypass injector in a gas turbine engine.

SUMMARY OF THE INVENTION

An actuation system for a gas turbine engine is provided for axially translating an annular member such as a cylindrical sleeve valve of a variable area bypass injector (VABI). In one embodiment, the actuation system comprises a crankshaft rotatably attached to an outer casing of the engine for transmitting rotational movement. A crankarm is pivotally connected between the annular member and the crankshaft for transmitting rotation of the crankshaft to helical motion of the annular member. Two linkarms are circumferentially spaced from the crankarm and are pivotally connected between the annular member and the outer casing. The linkarms are effective for synchronizing the motion of the annular member when the crankshaft is rotated.

BRIEF DESCRIPTION OF THE DRAWINGS

The invention, together with further objects and advantages thereof, is more particularly described in the following detailed description taken in conjunction with the accompanying drawing in which.

DETAILED DESCRIPTION

Figure 1:
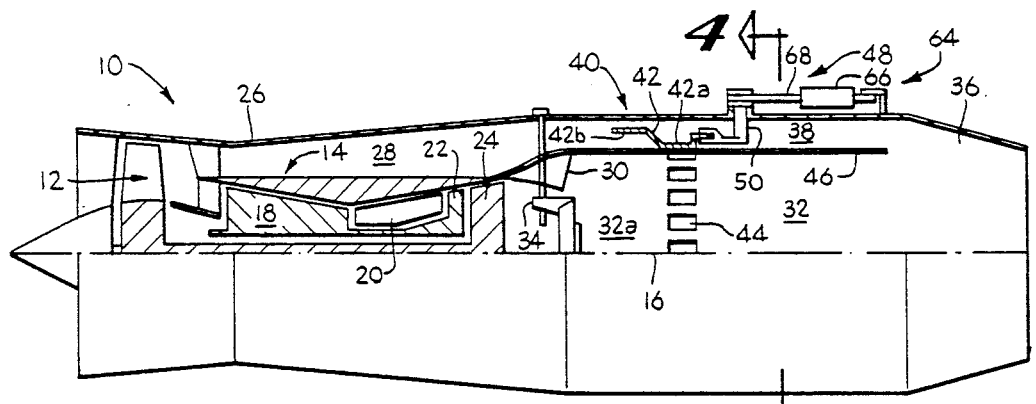
FIG. 1 is a sectional view of a variable cycle gas turbine engine including an actuation system according to one embodiment of the present invention that is effective for translating a cylindrical sleeve valve in an augmentor portion thereof.

Illustrated in FIG. 1 is a variable cycle, mixed flow gas turbine engine 10 including a fan assembly 12 driven by a core engine 14, both of which are disposed coaxially about an engine longitudinal axis 16. The core engine 14 includes a compressor 18, a combustor 20, a high pressure turbine 22 and a low pressure turbine 24.

The engine 10 further includes an annular outer casing 26 radially spaced from and surrounding the fan assembly 12 and the core engine 14. Defined between the outer casing 26 and the core engine 14 is an annular bypass duct 28. An annular mixer 30 is disposed at an aft end of the core engine 14 and is effective for mixing airflow from the bypass duct 28 and core exhaust gases from the low pressure turbine 24.

Disposed downstream of the mixer 30 and in the outer casing 26 is an annular afterburning section, or augmentor, 32. The augmentor 32 includes a fuel injector and flameholder assembly 34 disposed between the low pressure turbine 24 and a forward end 32a of the augmentor 32. The assembly 34 is effective for mixing fuel, bypass air and exhaust gases for providing additional thrust from the engine 10 when the augmentor 32 is in operation. The combined exhaust gases are discharged from the engine 10 through an exhaust nozzle 36.

When the augmentor 32 is in operation, it is desirable to direct a substantial portion of bypass airflow of the bypass duct 28 into the augmentor 32. When the augmentor 32 is not in operation, it is desirable to direct the airflow of the bypass duct 28 around the augmentor 32 and out the exhaust nozzle 36. To accomplish this, the augmentor 32 is spaced radially inwardly from the outer casing 26 for defining an annular passage 38 for communicating flow from the bypass duct 28 to the exhaust nozzle 36. A variable slot, variable area bypass injector (VABI) 40 is disposed at the forward end 32a of the augmentor 32. The VABI 40 is effective for varying mixing area by proportionately channeling airflow from the bypass duct 28 into the augmentor 32 and the annular passage 38.

Figure 2:
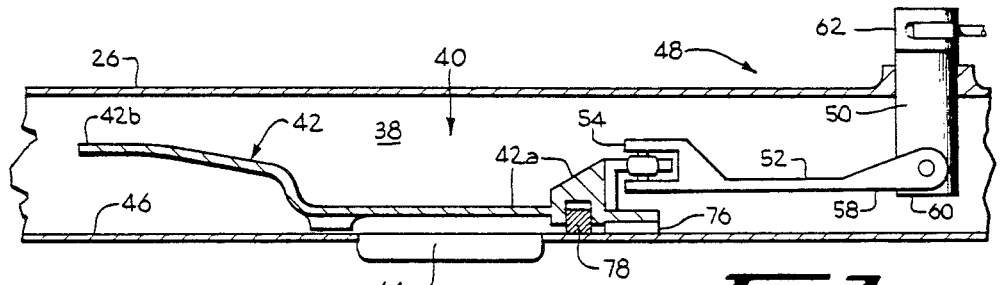
FIG. 2 is an enlarged sectional view of the sleeve valve and a portion of the actuation system of FIG. 1.

As shown in FIGS. 1 and 2, the VABI 40 includes a cylindrical sleeve valve 42 having an annular aft end portion 42a that is axially translatable for covering or uncovering a plurality of circumferentially spaced slots 44 disposed in a cylindrical guide member 46 of the augmentor 32. The aft portion 42a is positioned relatively close to the radially outer surface of the guide member 46 for substantially blocking airflow through the slots 44 when covered thereby (as shown). An annular forward end portion 42b of the sleeve valve 42 is radially spaced from the outer surface of the guide member 46 for diverting and channeling airflow from the bypass duct 28 through the slots 44 when uncovered by the aft portion 42a thereof.

Figure 3:
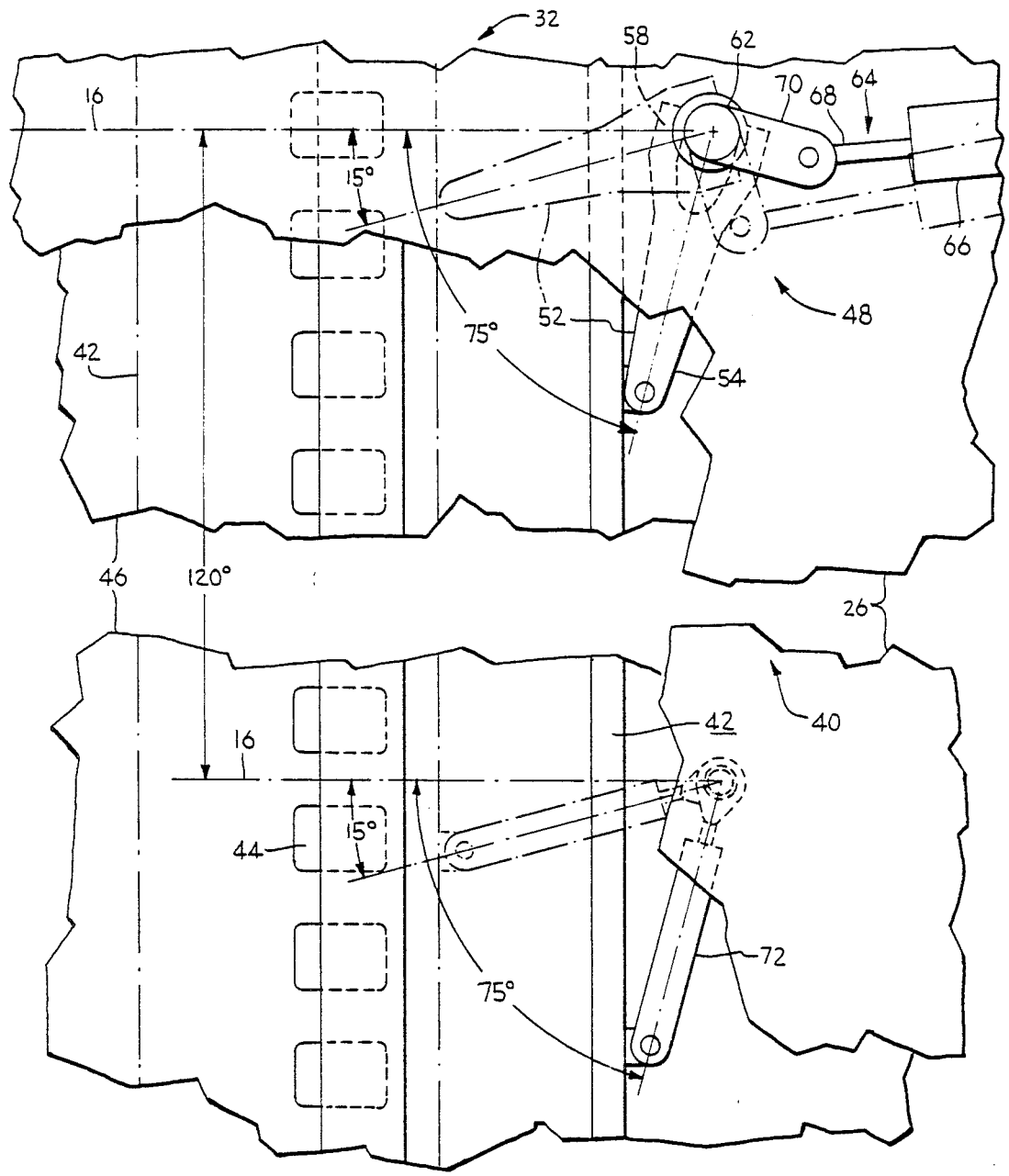
FIG. 3 is a view along a portion of the circumference of an augmentor portion of the turbine engine of FIG. 1, partly in section, illustrating in more detail the valve and actuation system.

The cylindrical sleeve valve 42 is axially translated by an actuation system 48 according to one embodiment of the present invention. Illustrated in more detail in FIG. 3 is the actuation system 48. The sleeve valve 42 is shown in a first, open position (solid lines) wherein airflow is allowed to pass through the slots 44 and into the augmentor 32. Shown in broken lines is the sleeve valve 42 in a second, closed position wherein airflow is prevented from passing through the slots 44 and into the augmentor 32. The sleeve valve 42 is translated between these two positions by the actuation system 48.

As shown in FIG. 2, the actuation system 48 comprises guide means, such as the cylindrical guide member 46 fixedly disposed in the engine 10. The guide member 46 is disposed radially inwardly from the sleeve valve 42 and is effective for substantially preventing the sleeve valve 42 from moving radially. The actuation system 48 further includes a crankshaft 50 which is rotatably attached at the casing 26 and in the embodiment shown, extends through the casing 26. A first crankarm 52 includes a first end 54 which is pivotally connected, by a ball joint for example, to the aft end 42a of the sleeve valve 42. The crankarm 52 further includes a second end 58, opposite to the first end 54, which is generally Y-shaped (as shown in FIG. 3) and is pivotally connected to a radially inner end 60 of the crankshaft 50. The first crankarm 52 is freely pivotable in the radial direction about the inner end 60 of the crankshaft 50. Furthermore, the crankarm 52 is effective for transmitting relatively large torques from the crankshaft 50 to provide an actuation force to the sleeve valve 42.

As illustrated in FIGS. 1 and 3, an actuation means 64 is connected to a radially outer end 62 of the crankshaft 50 and is effective for rotating the crankshaft 50 in either of two opposite directions. The actuation means 64 can comprise a suitable hydraulic cylinder 66 having one end fixedly attached to the outer casing 26, and an output rod 68 extending from an opposite end thereof. The output rod 68 extending from an opposite end thereof. The output rod 68 is pivotally connected, by a ball joint for example, to a second crankarm 70 fixedly attached to the radially outer end 62 of the crankshaft 50. The hydraulic cylinder 66 can comprise any suitable, conventional hydraulic cylinder which is effective for translating the output rod 68 in either of two opposite directions for thereby rotating the crankshaft 50 in correspondingly opposite directions for translating the sleeve valve 42.

Inasmuch as only a single actuation means 64 is provided for translating the sleeve valve 42, synchronizing means must be provided so that when the crankarm 52 transmits forces to the sleeve valve 42, the sleeve valve 42 will not jam when translating.

Figure 4:
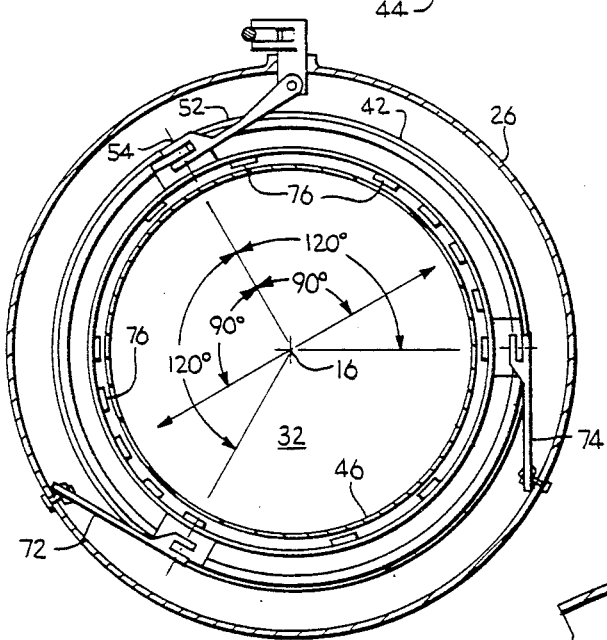
FIG. 4 is a sectional end view taken along line 4—4 in FIG. 1 illustrating relative positions of elements of the actuation system of FIG. 1.

The synchronizing means include the sleeve valve 42 itself, along with a first linkarm 72 and a second linkarm 74 shown in FIG. 4. The two linkarms 72 and 74 are elongated members having two opposite ends pivotally connected to the sleeve valve 42 and the casing 26. The linkarms 72 and 74 are effective for transmitting force along their longitudinal axes in compression and tension. The load applied by the crankarm 52 to the sleeve valve 42 is transmitted therethrough to the outer casing 26 by the two linkarms 72 and 74.

FIG. 4 also illustrates the circumferential positions of the crankarm 52 and the two linkarms 72 and 74. Inasmuch as only one crankarm 52 and two linkarms 72 and 74 are required for translating the sleeve valve 42, they are preferably spaced substantially equally about the circumference of the sleeve valve 42, and, as shown, at about 120° apart.

As more particularly shown in FIGS. 3 and 4, the crankarm 52 and the two linkarms 72 and 74 are of substantially equal length. The ends thereof that are attached to the sleeve valve 42 lie in a first plane and the opposite ends thereof lie in a second plane. These first and second planes are parallel to each other and perpendicular to the longitudinal axis 16. This allows the crankarm 52 and the two linkarms 72 and 74 to rotate substantially parallel to each other. For example, when the sleeve valve 42 is in the open position, the crankarm 52 and the two linkarms 72 and 74 are all parallel to each other and disposed at about 75° with respect to the longitudinal axis 16.

It will be appreciated that a crankarm 52 disposed at about 90° to the longitudinal axis 16 transmits primarily axial movement to the sleeve valve 42. This is desirable for obtaining a maximum amount of axial translation of the sleeve valve 42 with a minimum of rotation of the crankshaft 50. However, in this position the linkarms 72 and 74 could jam. Accordingly, the open position of the sleeve valve 42 is selected so that the crankarm 52 and the linkarms 72 and 74 are disposed at an angle less than about 90° relative to the longitudinal axis 16 and preferably at about 75°.

Figure 5:
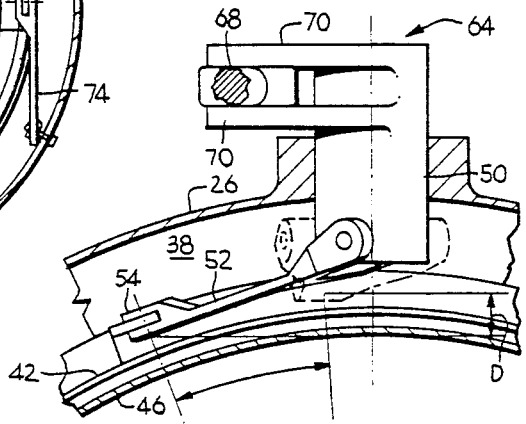
FIG. 5 is an enlarged view of a portion of FIG. 4, illustrating movement of a crankarm member.

When the crankarm 52 is caused to rotate, clockwise as shown in FIG. 3, by the actuation means 64, the sleeve valve 42 is caused to axially translate and circumferentially rotate in a helical motion. As this occurs, the ends of the crankarms 52 and the linkarms 72 and 74 attached to the sleeve valve 42 move relatively transversely outwardly from the respective opposite ends of the crankarm 52 and linkarms 72 and 74. The movement D of crankarm 52 as shown in FIG. 5 is representative of this movement. The pivotally connected ends of the crankarm 52 and the linkarms 72 and 74 effective for accommodating this differential transverse movement D.

During translation of the sleeve valve 42, the crankarm 52 and the linkarms 72 and 74 remain substantially parallel to each other and thus are effective for synchronizing the movement of the sleeve valve 42 for preventing tilting and binding thereof. When the sleeve valve is translated and rotated to the closed position (FIG. 3), the crankarm 52 and the linkarms 72 and 74 are disposed at about 15° with respect to the longitudinal axis 16. The closer these linkarms 72 and 74 approach the 0° position relative to the axis 16, the less axial motion of the sleeve valve 42 results and the greater is the resulting rotation of crankarm 52, which is undesirable. Accordingly, maximum travel of the sleeve valve 42 between the open and closed position is selected to coincide with positions of the crankarm 52 and the linkarms 72 and 74 of between about 75° and about 15°, respectively, with respect to the longitudinal axis 16.

Assisting in allowing synchronous movement of the sleeve valve 42 is the guide member 46 which prevents the sleeve valve 42 from moving in the radial direction. Inasmuch as one actuating means 64 is provided and all applied force and torque is transmitted through the one crankarm 52 to the sleeve valve 42, an unbalanced applied force condition exists.

As shown in FIG. 4, the unbalanced force is primarily directed in either of two high loading zones at about 90° to a line joining the first end 54 of the crankarm 52 and the longitudinal axis 16, i.e. in a tangential direction as shown in FIG. 3. The unbalanced force generates a friction force by pressing the sleeve valve 42 against the guide member 46. But for the guide member 46, the sleeve valve would be translated radially as well as axially, thus leading to a decrease in aerodynamic performance of the engine 10.

To reduce the friction forces between the sleeve valve 42 and the guide member 46 due to the unbalanced force, a plurality of bearings 76 are provided between the sleeve valve 42 and the guide member 46. The bearings 76 can comprise a plurality of bearing pads, such as temperature resistant carbon pads, circumferentially spaced about the guide member 46 and suitably secured to radially inner surfaces of the sleeve valve 42. Several of the bearings 76 are preferably positioned along the circumference of the sleeve valve 42 in the zone of high loading as shown in FIG. 4. The bearings 76 are also positioned at the aft end 42a of the sleeve valve 42 and in the first plane wherein the crankarm 52 and linkarms 72 and 74 join the sleeve valve 42, as shown in FIG. 2, for reducing the forces which tend to tilt the sleeve valve 42.

Also disposed at the aft end 42a of the sleeve valve 42 is an annular ring seal 78 suitably secured to the sleeve valve 42 and in sliding contact with the guide member 46. The ring seal 78 is effective for reducing leakage of airflow between the sleeve valve 42 and the guide member 46.

The actuation system 48 according to the present invention results in a system having few parts, thus being relatively simple and having reduced weight. Only one actuation means 64 and two linkarms 72 and 74 are required for efficiently translating the sleeve valve 42. The two linkarms 72 and 74 and the crankarm 52 are few in number and therefore reduce airflow blockage in the annular passage 38. Furthermore, these members can be made relatively thin and wide for further reducing airflow blockage while retaining their ability to transmit torque and longitudinal forces, respectively.

While there has been described herein what is considered to be the preferred embodiment of the invention, other embodiments will occur to those skilled in the art from the teachings herein. For example, the valve sleeve 42 can comprise a simple cylindrical valve not having the scoop structure 42b as shown in FIG. 2. Furthermore, the actuation system 48 can include various alternative axially translatable members and be effective in the structures disclosed in the references cited in the background of the invention.

Accordingly, having thus described the invention, what is desired to be secured by Letters Patent of the United States is:

I claim:

1. For a gas turbine engine including, an annular outer casing disposed coaxially about a longitudinal axis and an annular member mounted coaxially with and spaced radially inwardly from said casing, an actuation system for axially translating and circumferentially rotating said annular member in helical motion comprising:

guide means fixedly disposed in said engine for substantially preventing radial movement of said annular member;

a crankshaft rotatably attached at said casing for transmitting rotational movement;

a crankarm having a first end pivotally connected to said annular member and a second, opposite end connected to said crankshaft, said crankarm being effective for transmitting torque from said crankshaft to provide a force to said annular member; and two linkarms, each linkarm having two opposite ends pivotally joining said annular member and said casing and being effective for transmitting longitudinal force from said annular member to said casing;

said crankarm and said two linkarms being spaced circumferentially about said annular member and said two linkarms being effective for synchronizing translation and rotation of said annular member with respect to said longitudinal axis to prevent tilting thereof.

2. An actuation system according to claim 1 further comprising actuation means effective for rotating said crankshaft and said crankarm attached thereto for axially translating and circumferentially rotating said annular member.

3. An actuation system according to claim 1 wherein said crankarm and said two linkarms are disposed substantially parallel to each other.

4. An actuation system according to claim 1 further comprising a bearing member disposed between said annular member and said guide means for reducing friction therebetween.

5. An actuation system according to claim 1 wherein said two linkarms are substantially equally spaced about said annular member from said crankarm.

6. An actuation system according to claim 1 wherein said crankarm and said two linkarms are substantially equally spaced at about 120° to each other about said annular member.

7. An actuation system according to claim 1 wherein said guide means comprises a guide cylinder disposed radially inwardly from and coaxially with said annular member.

8. An actuation system according to claim 1 wherein said actuation means is disposed radially outwardly of said casing, and said crankshaft extends through said casing and includes a radially outer end connected to said actuation means and a radially inner end connected to said crankarm.

9. An actuation system according to claim 1 wherein said annular member is positionable between a first position wherein said crankarm and said two linkarms are disposed at about 75° with respect to said longitudinal axis and a second position wherein said crankarm and said two linkarms are disposed at about 15° therewith.

10. An actuation system according to claim 1 wherein said annular member comprises a cylindrical sleeve valve of a variable area bypass injector of said gas turbine engine and said guide means comprises a cylindrical guide member having a plurality of circumferentially spaced slots therein, airflow therethrough being controlled by the position of said sleeve valve.

11. In a gas turbine engine including an annular outer casing disposed coaxially about a longitudinal axis and a cylindrical sleeve valve mounted coaxially with and spaced radially inwardly from said casing, an actuation system for axially translating and circumferentially rotating said sleeve valve comprising:

a cylindrical guide member including a plurality of circumferentially spaced slots therein and fixedly mounted in said engine coaxially with and radially inwardly of said sleeve valve, said guide member being effective for substantially preventing said sleeve valve from moving radially;

only one crankshaft attached to and extending through said casing for transmitting rotational movement;

one crankarm having a first end pivotally connected to said sleeve valve and a second end pivotally connected to a radially inner end of said crankshaft, said crankarm being effective for transmitting torque from said crankshaft to provide a force to said sleeve valve;

actuation means attached to a radially outer surface of said casing and effective for rotating said crankshaft and said crankarm attached thereto for axially translating and circumferentially rotating said sleeve valve; and only two linkarms, each linkarm having two opposite ends pivotally joining said sleeve valve and said casing and being effective for transmitting longitudinal force from said sleeve valve to said casing;

said crankarm and said two linkarms being spaced substantially equally circumferentially about said sleeve valve and disposed substantially parallel to each other for effecting uniform translation and rotation of said sleeve valve with respect to said longitudinal axis to prevent tilting thereof.

12. An actuation system according to claim 11 wherein said sleeve valve is positionable between:

a first position wherein said crankarm and said two linkarms are each disposed at about 75° with respect to said longitudinal axis and said sleeve valve is in a position wherein said slots in said guide member are uncovered; and a second position wherein said crankarm and said two linkarms are disposed at about 15° with respect to said longitudinal axis and said sleeve valve is in a position covering said slots of said guide member.

* * * * *